(12) United States Patent
Kaul et al.

(10) Patent No.: US 12,288,044 B2
(45) Date of Patent: Apr. 29, 2025

(54) MICROSERVICE CREATION USING RUNTIME METADATA

(71) Applicant: International Business Machines Corporation, Armonk, NY (US)

(72) Inventors: Akshar Kaul, Bengaluru (IN); Himanshu Gupta, Vasant Kunj (IN); Sameep Mehta, Bengaluru (IN); Srikanth Govindaraj Tamilselvam, Chennai (IN); Amith Singhee, Bengaluru (IN); Vaibhav Sudhakar Dantale, Bibwewadi (IN); Ravi Vishnu Israni, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 18/160,125

(22) Filed: Jan. 26, 2023

(65) Prior Publication Data

US 2024/0256226 A1    Aug. 1, 2024

(51) Int. Cl.
*G06F 9/445* (2018.01)
*G06F 8/30* (2018.01)
*G06F 8/65* (2018.01)

(52) U.S. Cl.
CPC . *G06F 8/30* (2013.01); *G06F 8/65* (2013.01)

(58) Field of Classification Search
CPC .................................... G06F 8/30; G06F 8/65
USPC .................................................. 717/168–178
See application file for complete search history.

(56) References Cited

U.S. PATENT DOCUMENTS

| 10,162,610 | B2 | 12/2018 | Apte et al. |
| 11,442,725 | B1* | 9/2022 | Chawda .................... G06F 8/76 |
| 2019/0108067 | A1 | 4/2019 | Ishikawa et al. |
| 2019/0171438 | A1* | 6/2019 | Franchitti ................. G06N 3/08 |
| 2021/0042638 | A1* | 2/2021 | Novotny ................ G06N 20/00 |
| 2021/0234930 | A1 | 7/2021 | Dinh et al. |
| 2021/0334194 | A1 | 10/2021 | Xiao et al. |
| 2022/0357940 | A1* | 11/2022 | Crane ................. G06F 11/3089 |

OTHER PUBLICATIONS

Desai et al., "Graph Neural Network to Dilute Outliers for Refactoring Monolith Application," 35th AAAI Conference on Artificial Intelligence (AAAI 2021), Feb. 2-9, 2021, 13 pages. https://arxiv.org/pdf/2102.03827.pdf.
Mathai et al., "Monolith to Microservices: Representing Application Software through Heterogeneous Graph Neural Network," 2022 International Joint Conference on Artificial Intelligence (IJCAI-22), Jul. 23-29, 2022, Vienna, Austria, 15 pages.

* cited by examiner

*Primary Examiner* — Chuck O Kendall
(74) *Attorney, Agent, or Firm* — Yee & Associates, P.C.

(57) ABSTRACT

A computer implemented method creates microservices for an application. A number of processor units clusters programs and data structures for the application using runtime metadata to form groups of the programs and data structures. The runtime metadata is obtained from running the application. The number of processor units creates a design for the microservices for the application using the groups of the programs and the data structures.

20 Claims, 14 Drawing Sheets

MICROSERVICE CREATION USING RUNTIME METADATA

BACKGROUND

1. Field

The disclosure relates generally to an improved computer system and more specifically to creating microservices for an application using runtime metadata associated with data.

2. Description of the Related Art

A monolithic architecture is a traditional model for a software application. In this traditional model, the software application is built as a unified unit that is self-contained and independent from other applications. This type of application is difficult to manage because interdependent processes in the application can be easily affected if a single process in the application fails or has an error. In addition, adding or enhancing features of a monolith application becomes more complicated because the code for all of the features are deployed together.

Another type of architecture for applications is a microservices architecture. With this type of architecture, an application is represented as a set of microservices where each microservice includes programs and data structures for one functionality of the application. With a microservices architecture, an application is built as a collection of independent components. For example, a business transaction application built with a microservices architecture can have a microservice that functions to perform monetary transactions, and another microservice that performs invoice creation.

Microservices in a microservices architecture can be deployed, updated, and scaled according to the demand for their specific functions. The different microservices run independently of each other making deployment and updating less complex.

SUMMARY

According to one illustrative embodiment, a computer implemented method creates microservices for an application. A number of processor units clusters programs and data structures for the application using runtime metadata to form groups of the programs and data structures. The runtime metadata is obtained from running the application. The number of processor units creates a design for the microservices for the application using the groups of the programs and the data structures. According to other illustrative embodiments, a computer system and a computer program product for creating microservices for an application are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
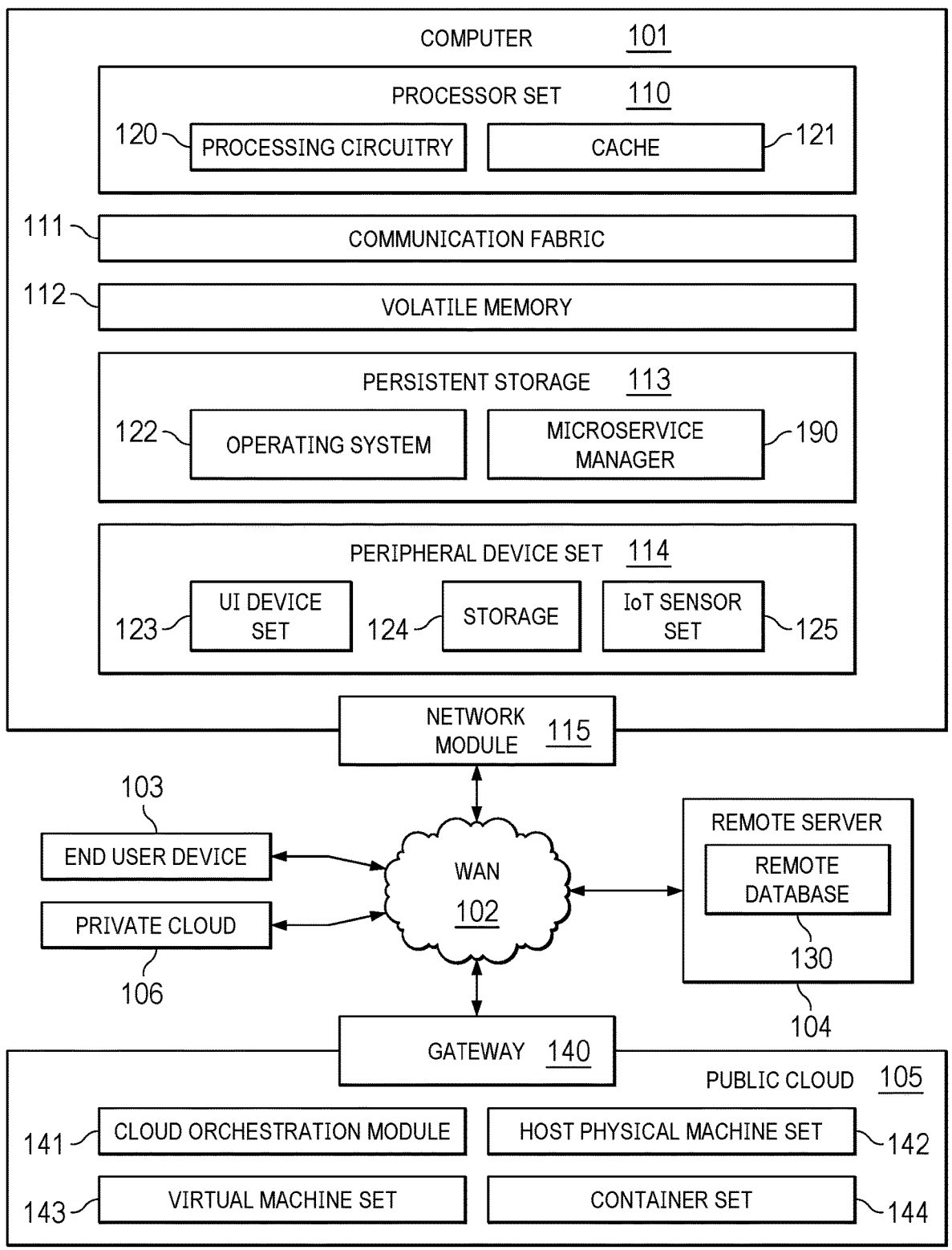
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as microservice manager 190. In addition to microservice manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and microservice manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in microservice manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in microservice manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. With the advantages of using a microservice architecture, applications currently using a monolithic architecture can be translated to use a microservice architecture. In performing a translation from a monolithic architecture to a microservice architecture, it is desirable to meet various objectives and optimize the design of the application using microservices.

One issue recognized by the different illustrative embodiments is the occurrence of friction issues in translating an application from a monolithic architecture to a microservice architecture. A friction issue can occur when a monolithic application is split into microservices. This friction issue can involve data access issues in accessing data. The data access performed in the application may not work or be effectively performed when the programs are placed into different microservices. Updates or changes to the code for the programs placed into microservices are often needed to handle these data access issues.

For example, a data access issue can occur when a cross micro database query is performed. This type of query involves a query that involves two or more tables in different micro databases. In this example, the two tables were previously in the same database. Updates may need to be made to the program and query language statements used by the program to enable the program to generate sub-queries to access the two tables in the two micro databases and combine the results. Without this update, the query cannot be made by the program placed in to a microservice.

Another example of an operation involving a data access issue is a cross micro database access. With a cross micro database access, a program is located in a first service. This program executes the query on a table in a second microservice. As a result, the query crosses microservices. This situation is undesirable because data should be accessed by programs in the same microservice in a microservice architecture. With this situation, updates to the code to programs may be needed. For example, new application programming (API) end points may need to be exposed to enable cross micro database access.

As yet another example, the cross micro database transaction can also result in data access issues. This type of transaction contains queries updating data located in different micro databases. Updates to the code may also be needed to enable the transaction to be made on different micro databases.

With respect to optimizing the operation of microservices, clustering algorithms can be used to group programs and data structures for placement into microservices. Current clustering algorithms only take into account the static metadata associated with programs and data structures. The performance of the clustering algorithms can be improved by using runtime metadata obtained from running the application.

Thus, the illustrative embodiments recognize and take into account that using runtime metadata pertaining to the data access by the application can be used to group programs and data structures into microservices that provide higher performance as compared to current clustering techniques. In one illustrative example, a computer implemented method, computer system, and computer program product for creating microservices for an application is provided. A number of processor units clusters programs and data structures for the application using runtime metadata to form groups of the programs and data structures. The runtime metadata is obtained from running the application and recording how the application interacts with the data. The number of processor units creates a design for the microservices for the application using the groups of the programs and the data structures. This design can then be used to implement the microservices for the application.

Figure 2:
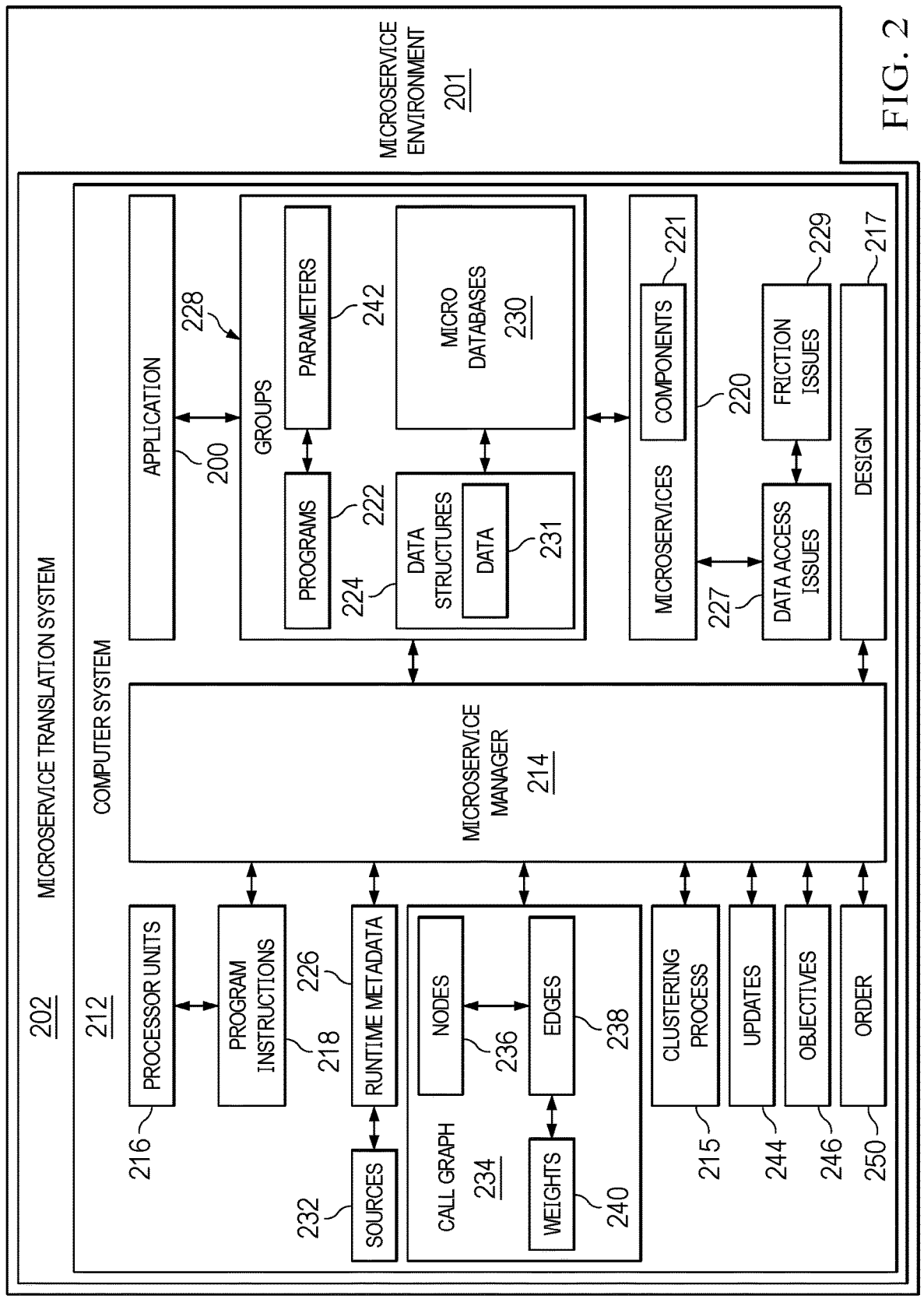
FIG. 2 is a block diagram of a microservice environment in accordance with an illustrative embodiment.

With reference now to FIG. 2, a block diagram of a microservice environment is depicted in accordance with an illustrative embodiment. In this illustrative example, microservice environment 201 includes components that can be implemented in hardware such as the hardware shown in computing environment 100 in FIG. 1.

In this illustrative example, microservice translation system 202 can translate application 200 for from a monolithic architecture to a microservice architecture. In this illustrative example, microservice translation system 202 comprises computer system 212 and microservice manager 214. Microservice manager 214 is located in computer system 212.

Microservice manager 214 can be implemented in software, hardware, firmware or a combination thereof. When software is used, the operations performed by microservice manager 214 can be implemented in program instructions configured to run on hardware, such as a processor unit. When firmware is used, the operations performed by microservice manager 214 can be implemented in program instructions and data and stored in persistent memory to run on a processor unit. When hardware is employed, the hardware can include circuits that operate to perform the operations in microservice manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are on the same computer or on different computers. In other words, the process can be distributed between processor units 216 on the same or different computers in computer system 212. Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, microservice manager 214 creates design 217 for microservices 220 for application 200 using groups 228 of programs 222 and data structures 224. In this example, design 217 has microservices 220 and identifies programs 222 and data structures 224 in microservices 220.

Microservices 220 can be comprised of programs 222 and data structures 224 for application 200. The creation of design 217 is part of the creation process for microservices 220. Microservice manager 214 uses clustering process 215 to cluster programs 222 and data structures 224 for application 200 using runtime metadata 226 to form groups 228 of programs 222 and data structures 224. In this illustrative example, the data structures can be, for example, a table, a flat file, a vector, or some other data structure. Clustering process 215 can be, for example, a Leiden method, a Louvain method, or other suitable clustering algorithms.

Programs 222 or programs in application 200 can be reorganized and grouped to form microservices 220 for design 217. In this example, runtime metadata 226 is obtained from running application 200. In this example, runtime metadata 226 is information describing how programs 222 in application 200 interact with data 231 in data structures 224 in response to running application 200. In these examples, the interactions can be recorded to obtain runtime metadata 226. A program can be a set of functions.

Runtime metadata 226 for the interaction of programs 222 in application 200 can take a number of different forms. For example, runtime metadata 226 can be selected from a group comprising at least one of a frequency a table is accessed by a particular program, an execution frequency of queries on a database, a frequency at which different queries are made by a program, average time to execute a query, change in data schemas, times at which the queries are executed, or an average output size for the query or other types of data that can be detected or observed from running application 200.

In this example, sources 232 of runtime metadata 226 can take a number of different forms. For example, sources 232 can be selected from at least one of a data baseline, an automatic workload repository report on database activity, and application performance monitoring tool that monitors performance about interactions, and other sources that can record the interaction of programs 222 for application 200 in response to running application 200.

As depicted, microservice manager 214 creates design 217 for microservices 220 for application 200 using the groups of the programs 222 and data structures 224. In this example, when data structures 224 take the form of tables. Design 217 can also recommend which tables are placed into micro databases 230 in microservices 220. These tables may have originated from a database for application 200.

In this example, design 217 identifies microservices 220 including programs 222 and data structures 224 within those microservices. Additionally, design 217 can also include the placement of data structures 224, such as tables, within micro databases in microservices 220.

In this illustrative example, the clustering of programs 222 and data structures 224 to form groups 228 can be performed in a number of different ways. For example, microservice manager 214 creates call graph 234. Call graph 234 comprises nodes 236 and edges 238 that connect nodes 236. In this example, nodes 236 in call graph 234 represent programs 222 and data structures 224 in application 200. Connections between nodes 236 identify relationships between programs 222 and relationships between programs 222 and data structures 224.

Microservice manager 214 clusters programs 222 and data structures 224 for application 200 using call graph 234 and runtime metadata 226 to form groups 228 of programs 222 and data structures 224. In this example, runtime metadata 226 is obtained from running application 200.

Further in this illustrative example, runtime metadata 226 can be used to generate weights 240. Microservice manager 214 can set weights 240 for edges 238 in call graph 234 using the runtime metadata 226.

Weights 240 for edges 238 can be based on a number of parameters 242 regarding interaction that programs 222 have with data 231 in data structures 224. These parameters can include at least one of a frequency, an average time, a frequency of data schema changes, a time when queries are made, an output size, and other parameters. The values for these parameters can be determined from runtime metadata 226.

After groups 228 have been generated from clustering programs 222 and data structures 224, microservice manager 214 can adjust groups 228. These adjustments can result in changing which programs and data structures are located in different groups in groups 228.

For example, the adjustment can be in the form of a recommendation of updates 244 to groups 228 to meet a set of objectives 246. The set of objectives 246 can include at least one of moving or replicating a program to a selected microservice to reduce the frequency of data access issues 227, moving or replicating the program to the selected microservice to reduce execution time in executing queries with data access issues 227, moving a program to a microservice to align the program with the business domain alignment, moving tables to a micro database in a microservice to ensure that tables with schemas that change frequently are in the same micro database. Data access issues 227 in accessing data 231 in microservices 220 can also be referred to as friction issues 229.

These and other updates can be recommended by microservice manager 214 based on analyzing runtime metadata 226. Updates 244 to groups 228 can be made prior to creating design 217 or can be made as an update to design 217.

In one illustrative example, microservice manager 214 can recommend updates 244 to groups 228 that meets an objective to reduce data access issues 227 in accessing data 231 using a plurality of components 221 in microservices 220. Components 221 can be programs 222 and data structures 224.

With the presence of a data access issue, the data access performed in application 200 may not work when programs 222 from application 200 are placed into microservices 220. Updates to at least one of the code for programs 222 or data structures 224 may be needed to reduce these data access issues.

In yet another example, the set of objectives 246 can include meeting specifications or goals for at least one of program to program interaction, program to data interaction, business domain alignment, or other types of goals. In yet another illustrative example, the set of objectives 246 can include reducing execution time to meet service level objectives.

Meeting all of objectives 246 may not be possible. A trade-off can be present among different objectives in objectives 246. Updates 244 can result in improvements in meeting some of objectives 246 while reduction or degradation can occur in meeting other objectives in objectives 246 to recommend the set of objectives 246.

For example, reducing the data access issues can increase the amount of time needed to implement microservices 220. In this example, updates 244 can be identified that reduce data access issues 227. These updates can include changing the location of at least one of a program, or a data structure, or a micro database in microservices 220.

In this illustrative example, updates 244 can be identified using various analysis programs for meeting objectives 246. For example, a machine learning model can be used to recommend updates 244. As another example, recommendations of updates 244 can also be made by subject matter experts reviewing groups 228 of programs 222 and data structures 224 with respect to objectives 246. These recommendations can be sent to a user, a program, or other component that can select one or more of updates 244.

Microservice manager 214 can also recommend order 250 for the creation of these microservices in design 217. In this example, microservice manager 214 can determine order 250 in which to create microservices 220 for the application based on the complexity of each of the microservices. In this example, the complexity can be the amount of time needed to create each microservice. The amount of time needed to create a microservice can include time for updating or modifying programs placed into a microservice such that the program can operate and interact with other programs or data structures such as micro databases.

Microservice manager 214 can create or update design 217 to reflect a number of updates 244 to groups 228 of programs 222 and data structures 224 based a selection of the number of the updates 244.

With design 217 for microservices 220, microservices 220 can be created for application 200. In this illustrative example, this creation of microservices 220 can be performed with less time and effort based on design 217. Design 217 can reduce data access issues. Further, design 217 can also meet enable meeting service level objectives for responses.

In one illustrative example, one or more technical solutions are present that overcome a problem in efficiently translating applications from a monolithic architecture to a microservices architecture. As a result, one or more technical solutions can reduce the amount of data access issues present when placing programs and data structures into groups for generating microservices.

Computer system 212 can be configured to perform at least one of the steps, operations, or actions described in the different illustrative examples using software, hardware, firmware or a combination thereof. As a result, computer system 212 operates as a special purpose computer system in which microservice manager 214 in computer system 212 enables creating microservices for applications. For example, microservice manager 214 transforms computer system 212 into a special purpose computer system as compared to currently available general computer systems that do not have microservice manager 214.

In the illustrative example, the use of microservice manager 214 in computer system 212 integrates processes into a practical application for creating a design for microservices that when implemented increases the performance of computer system 212. In other words, microservice manager 214 in computer system 212 is directed to a practical application of processes integrated into microservice manager 214 in computer system 212 clusters programs and data structures for an application into groups to create a design 217 for microservices 220 using runtime metadata 226. In this illustrative example, microservice manager 214 in computer system 212 can create microservices 220 that require less updates to code and meet a set of objectives 246.

The illustration of microservice environment 201 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, clustering process 215 is shown as a separate component from microservice manager 214. In another illustrative example, this component can be implemented as part of microservice manager 214. In yet another illustrative example, sources 232 can be external to computer system 212 and microservice translation system 202. Further, microservice manager 214 can operate to concurrently analyze and group programs for one or more applications in addition to application 200 to create designs for translating these applications from a traditional monolithic architecture into applications that use microservices. Further, microservice manager 214 can be used to transform create microservices 220 using design 217. In this example, translation can occur by creating microservices 220. These microservices can be created using programs 222 and data structures 231 with any modifications these components needed to reduce data access issues 227.

Figure 3:
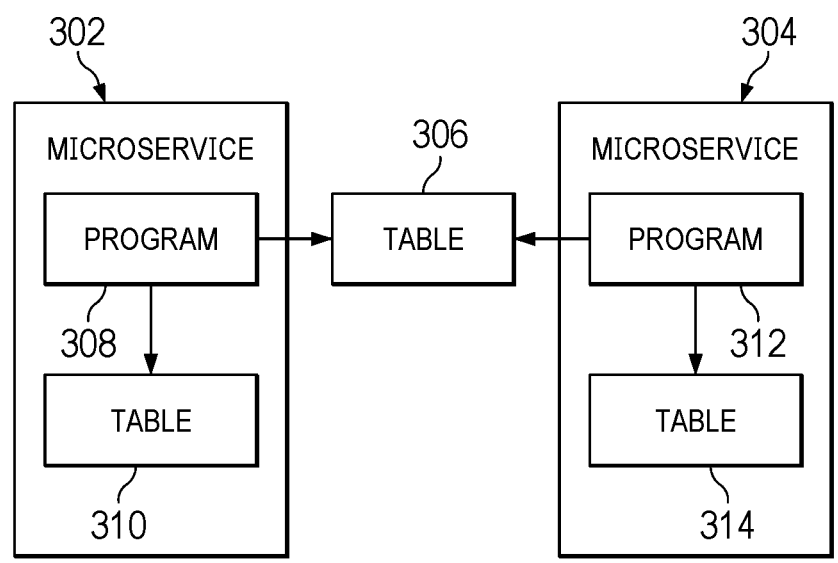
FIG. 3 is a block diagram of placing a table in a microservice in accordance with an illustrative embodiment.

With reference to FIG. 3, a block diagram of placing a table in a microservice is depicted in accordance with an illustrative embodiment. In this illustrative example, microservice 302 and microservice 304 are examples of microservices 220 in FIG. 2. As depicted, microservice 302 includes program 308 and table 310, and microservice 304 includes program 312 and table 314. In this example, table 306 has not been placed in a microservice.

Program 308 and program 312 are examples of programs 222 in FIG. 2. Table 310, table 314, and table 306 are examples of data structures 224 in FIG. 2.

In this illustrative example, program 308 accesses table 310 and program 312 accesses table 314. Program 308 and program 312 access table 306.

In this example, table 306 can be placed in microservice 302 or microservice 304 using a clustering process using runtime metadata in which the clustering process takes into account a number of criteria. These criteria can include, for example, what programs access a table, access frequency, schema changes frequency, execution times, query firing times for tables, and other considerations that associated with runtime metadata related to a table. These criteria can be used in the clustering process to provide improved clustering of programs and data structures into groups for microservices using runtime metadata.

In this example, in considering access frequency and what programs access a table, table 306 can be placed in a microservice with a program that more frequently accesses table 306 as compared to other programs in other microservices. As another example, table 306 can be placed in a microservice with a program that executes more join queries involving table 306 as compared to other microservices.

With schema changes frequencies, table 306 can be placed in microservice 302 when table 310 and table 306 both have frequent schema changes. In considering execution times, table 306 can be placed in microservice 304 when queries made by program 312 to table 306 require longer execution times than desired. The placement of table 306 can reduce delay in program 312 executing queries on table 306.

When queries on table 314 and table 306 are made around same time, table 314 and table 306 can be placed in microservice 304 based on query execution times for tables as a criterion. This placement of table 314 and table 306 can reduce execution times.

Figure 4:
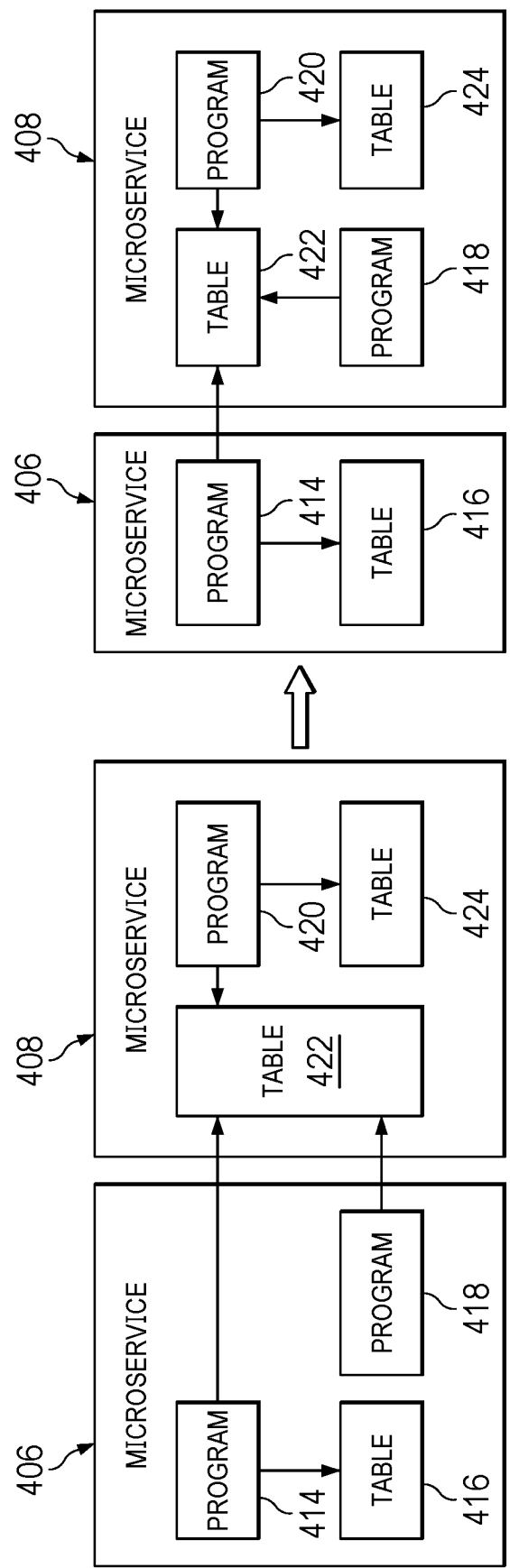
FIG. 4 is a diagram illustrating placing components into microservices is depicted in accordance with an illustrative embodiment.

With reference to FIG. 4, a diagram illustrating placing components into microservices is depicted in accordance with an illustrative embodiment. In this example, programs and tables are components that can be clustered using a clustering process to group these components into groups for microservices. In this example, the components comprise program 414, program 418, and program 420, table 416, table 422, and table 424. The programs are examples of programs 222 in FIG. 2 and the tables are examples of data structures 224 in FIG. 2.

Clustering of these components can form groups for microservice 406 and microservice 408, which are examples of microservices 220 in FIG. 2. As depicted, microservice 406 includes program 414, program 418, and table 416, and microservice 408 includes program 420, table 422, and table 424.

In this example, program 414 accesses table 416 and table 422, and program 418 accesses table 422. Program 420 accesses table 422 and table 424. As depicted, program 418 in microservice 406 accesses table 422 in microservice 408. Program 418 does not access tables in microservice 406. In this example, a cross micro database access is present because program 418 and table 422 are in different microservices.

Further, a cross micro database access is also present with respect to program 414 accessing table 422. In this example, program 414 also accesses table 416 located in microservice 406 with program 414. As a result, placing program 414 in microservice 408 does not provide improvements with respect to cross micro database accesses. Further, moving table 422 into microservice 406 also may not provide desired improvements in database access issues.

In this illustrative example, clustering of these components taking into account runtime metadata using criteria to reduce data access issues results in program 418 being placed in the same microservice as table 422. This placement of program 418 results in a grouping for microservices that avoids a cross micro database access. Additionally, the reduction in execution time for executing queries can also occur with this movement of program 418.

Thus, the use of runtime metadata can influence the decision in placing program 418. Additionally, the use of runtime metadata in a clustering process can also influence the placement of tables. These placements can be performed to reduce data access issues that can occur with placing programs and tables for an application into microservices.

Figure 5:
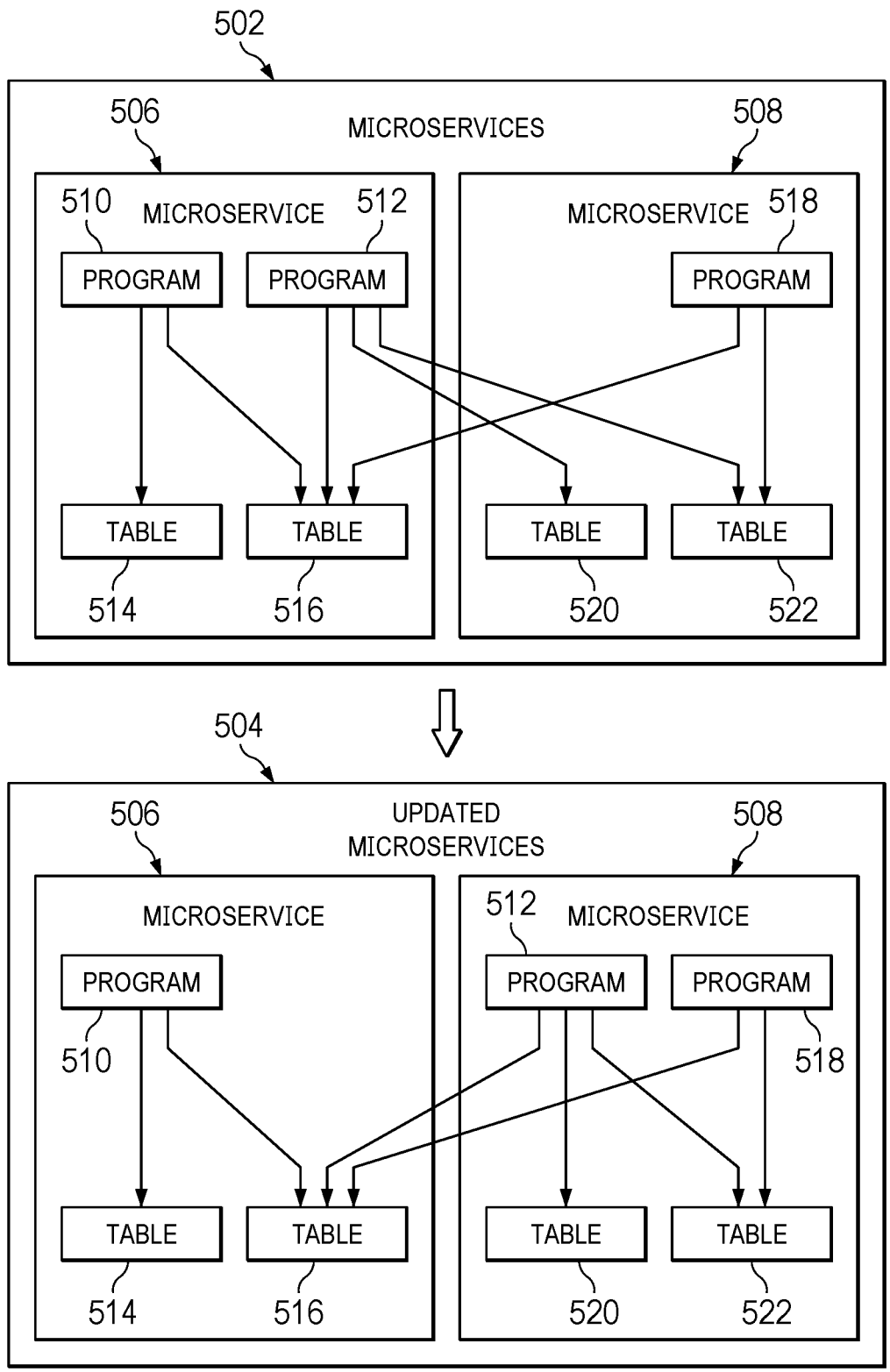
FIG. 5 is a diagram illustrating updating microservices using recommendations in accordance with an illustrative embodiment.

With reference to FIG. 5, a diagram illustrating updating microservices using recommendations is depicted in accordance with an illustrative embodiment. Recommendations for updating groups in microservices are based on a number of considerations. For example, these considerations include business domain alignments for microservices, schema change frequency, program to program interaction, program to data interaction, friction issues, and execution times.

In this illustrative example, microservices 502 comprises microservice 506 and microservice 508, which are examples of microservices 220 in FIG. 2. In this example, the groupings for 502 microservices can be refined or updated to meet objectives. These objectives can be, selected from least one of a business domain alignment, increasing program the program interaction, increasing program to data interaction, reducing data access issues, reducing execution times, meeting service level objectives (SLOs), or other objectives.

As depicted in microservices 502, microservice 506 includes program 510, program 512, table 514, and table 516, and microservice 508 includes program 518, table 520, and table 522. Program 510, program 512, and program 518 are examples of programs 222 in FIG. 2. Table 514, table 516, table 520, and table 522 are examples of data structures 224 in FIG. 2.

As shown, program 510 accesses table 514 and table 516, and program 512 accesses table 516, table 520, and table 522. Program 518 accesses table 516 and table 522.

In this example, one objective for updating microservices 502 includes reducing data access issues. With the configuration of microservices 502, data access issues can occur when accessing data in these microservices. In this example, a database access issue in the form of a cross micro database query is present with the placement in microservices 502. For example, program 512 is from an application with a monolithic architecture and in its current form is unable to generate requests to access table 520 and table 522 located in a different microservice from program 512.

In considering data access issues for microservices 502, an update to grouping programs and tables in microservices 502 can be made to reduce this data access issue. For example, program 512 can be moved from microservice 506 to microservice 508 as illustrated in updated microservices 504. This movement reduces the number of cross database queries performed by program 512. By moving program 512 to microservice 508, a cross database query for table 520 and table 522 is avoided.

Moving program 512 from microservice 506 to microservice 508 results in program 512 making a cross database query to table 516. However, this is an improvement over having two sets of cross database queries being made to two tables. Updated microservices 504 can be used as a recommendation to update the microservices to meet an objective of reducing database access issues.

The illustration of the groupings of programs and tables and updating groups and tables in FIGS. 4-5 are provided as a simple example to demonstrate some features in the illustrative examples. These illustrations are not meant to limit the manner in which other illustrative examples can be implemented. For example, in other illustrative examples, additional groupings for microservices can be created. For example, 50, 300, 2000, or some other number of microservices can be generated for a design such as design 217 in FIG. 2, to implement an application using microservices.

As another example, other objectives can be taken into account reducing data access issues when updating groupings of programs and tables. For example, updates to the placement of programs and tables can be made taking into account reducing execution time. This and other objectives can be used in addition to or in place of reducing data access issues that can require modifications to programs.

Figure 6:
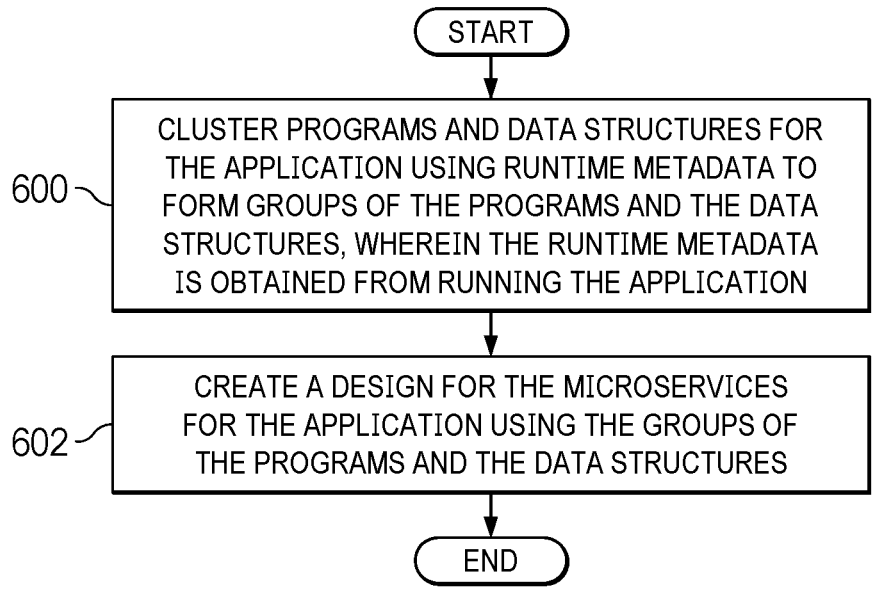
FIG. 6 is a flowchart of a process for creating microservices in accordance with an illustrative embodiment.

Turning next to FIG. 6, a flowchart of a process for creating microservices is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in microservice manager 214 in computer system 212 in FIG. 2.

The process clusters programs and data structures for the application using runtime metadata to form groups of the programs and the data structures, wherein the runtime metadata is obtained from running the application (step 600). The process creates a design for the microservices for the application using the groups of the programs and the data structures (step 602). The process terminates thereafter.

Figure 7:
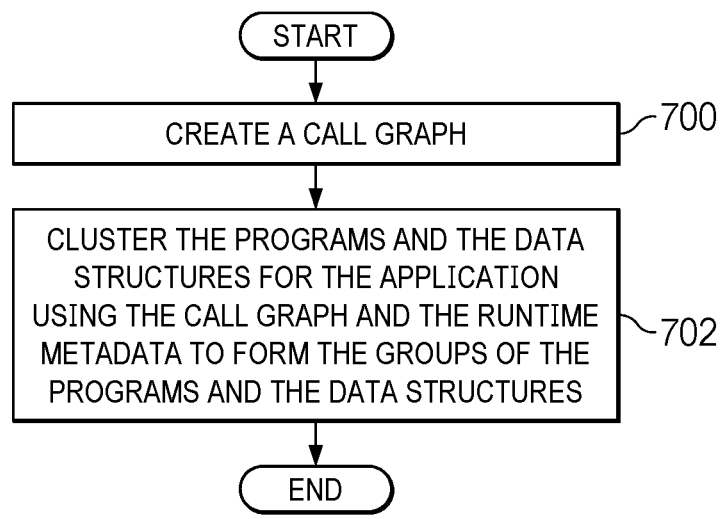
FIG. 7 is a flowchart of a process for clustering programs and data structures in accordance with an illustrative embodiment.

With reference now to FIG. 7, a flowchart of a process for clustering programs and data structures is depicted in accordance with an illustrative embodiment. The process in this flowchart is an example of an implementation for step 600 in FIG. 6.

The process begins by creating a call graph (step 700). In step 700, nodes in the call graph represent the programs and the data structures in the application. In this step, edges between the nodes identify relationships between the programs and between the programs and the data structures.

The process clusters the programs and the data structures for the application using the call graph and the runtime metadata to form the groups of the programs and the data structures (step 702). The process terminates thereafter.

In step 702, the runtime metadata is obtained from running the application. For example, the runtime metadata can be recorded while the application runs. The clustering can also take into account observations of parameters related to how data is accessed from running the application. The metadata can be recorded in logs, reports, databases, and other locations.

Figure 8:
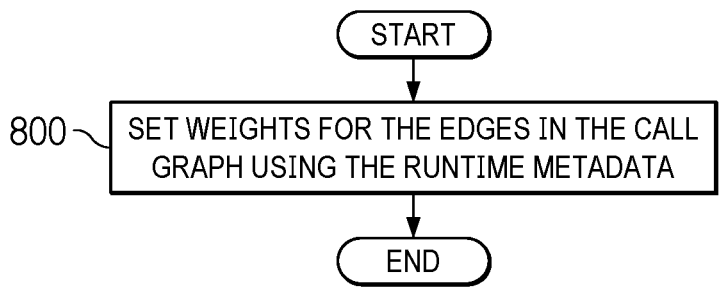
FIG. 8 is a flowchart of a process for setting weights for use in clustering in accordance with an illustrative embodiment.

In FIG. 8, a flowchart of a process for setting weights for use in clustering is depicted in accordance with an illustrative embodiment. The process in this flowchart is an example of an additional step that can be performed with the steps in the flowchart in FIG. 7.

The process sets weights for the edges in the call graph using the runtime metadata (step 800). The process terminates thereafter. In step 800, the runtime metadata is about how the application interacts with data. In this step, the runtime metadata is used to set the weights that can be selected from a group, consisting at least one of a frequency a table is accessed by a particular program, an execution frequency of queries on a database, a frequency at which different queries are made by a program, average time to execute a query, change in data schemas, times at which the queries are executed, or an average output size for the query.

Figure 9:
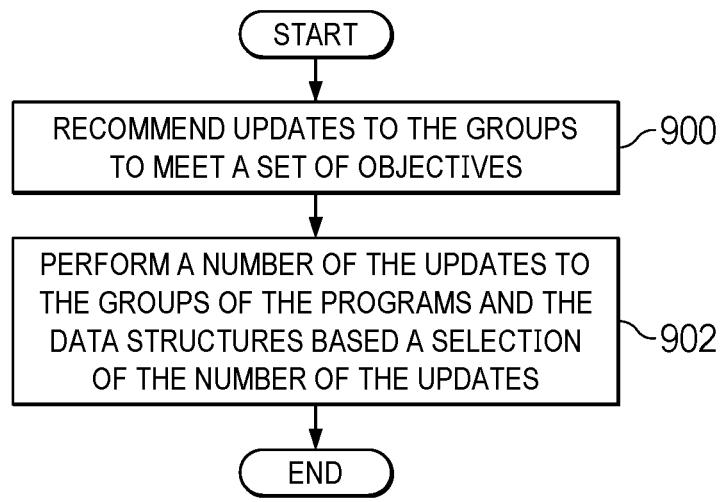
FIG. 9 is a flowchart of a process for updating groups of programs and data structures is depicted in accordance with an illustrative embodiment.

With reference now to FIG. 9, a flowchart of a process for updating groups of programs and data structures is depicted in accordance with an illustrative embodiment. The process in this flowchart is an example of an additional step that can be performed with the steps in the flowchart in FIG. 6.

The process begins by recommending updates to the groups to meet a set of objectives (step 900). The updates can be sent to a user. The user can be, for example, a human operator such as a subject matter expert, a machine learning model, or some other suitable user that can select updates recommended in step 900.

The process performs a number of the updates to the groups of the programs and the data structures based a selection of the number of the updates (step 902). The process terminates thereafter.

Figure 10:
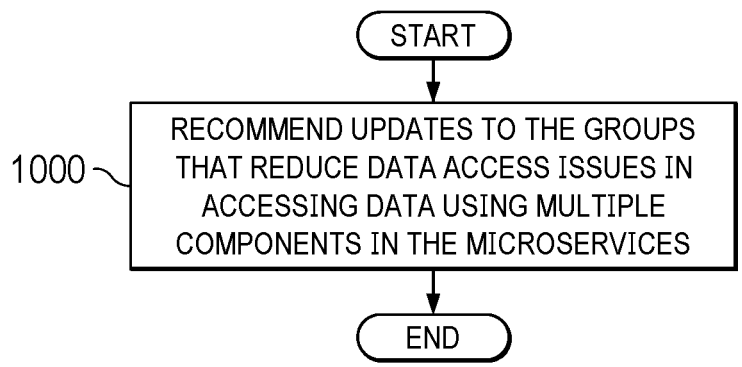
FIG. 10 is a flowchart of a process for recommending and updates to groups of programs and data structures in accordance with an illustrative embodiment.

Next in FIG. 10, a flowchart of a process for recommending and updates to groups of programs and data structures is depicted in accordance with an illustrative embodiment. The process in this flowchart is an example of an implementation of step 900 in FIG. 9.

The process recommends updates to the groups that reduce data access issues in accessing data using multiple components in the microservices (step 1000). The process terminates thereafter.

Figure 11:
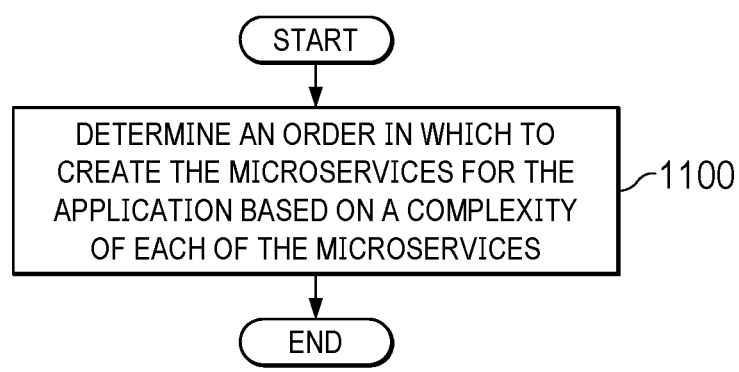
FIG. 11 is a flowchart of a process for setting weights for use in clustering in accordance with an illustrative embodiment.

With reference to FIG. 11, a flowchart of a process for setting weights for use in clustering is depicted in accordance with an illustrative embodiment. The process in this flowchart is an example of an additional step that can be performed with the steps in the flowchart in FIG. 6.

The process determines an order in which to create the microservices for the application based on a complexity of each of the microservices (step 1100). In step 1100, the runtime metadata can be used to determine this order. The process terminates thereafter. In this example, the order determined in step 1100 can be used to set the order of microservice creation in step 602 in FIG. 6.

Figure 12A:
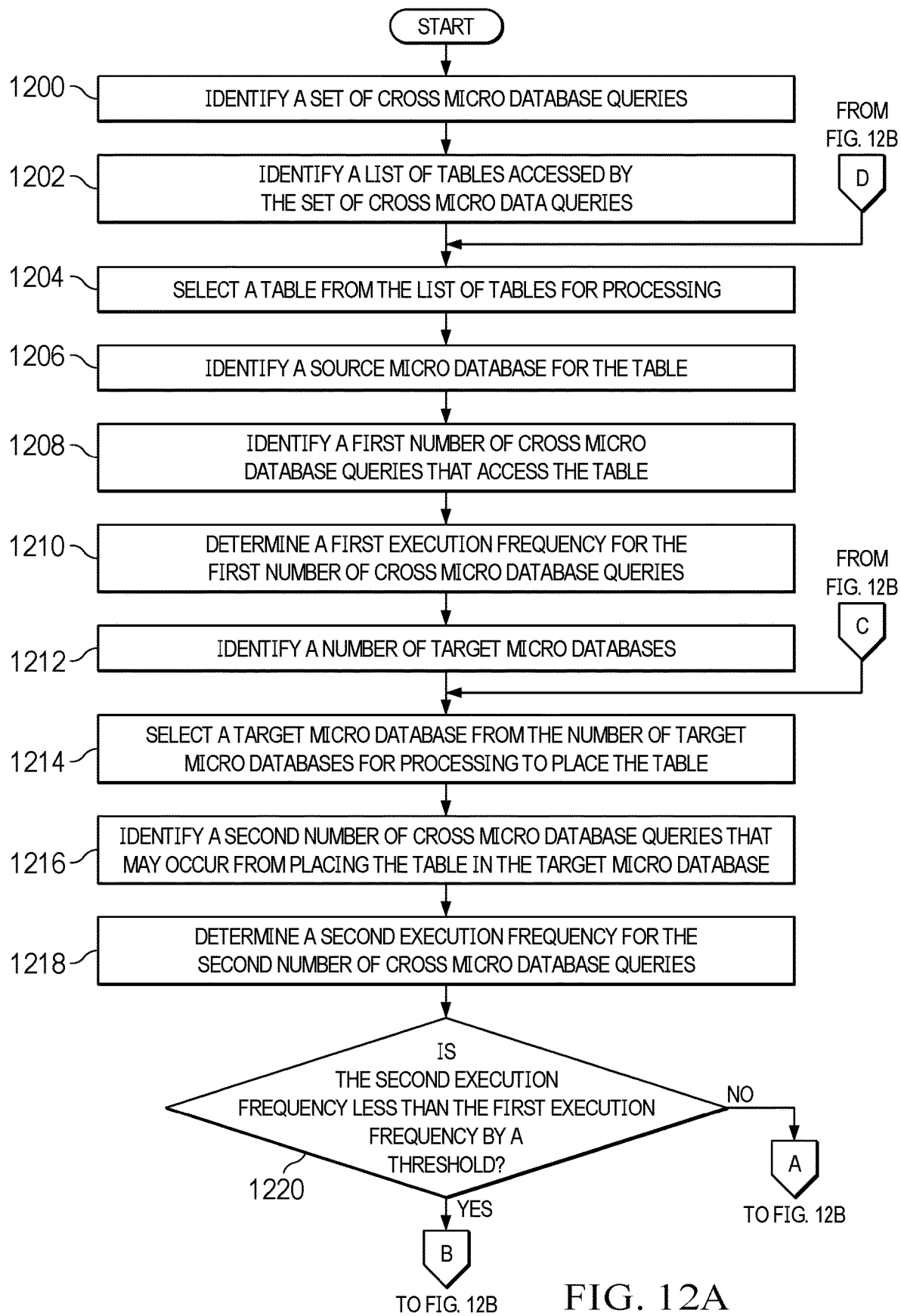
FIGS. 12A and 12B are a flowchart of a process for recommending updates to groups for microservices in accordance with an illustrative embodiment.
Figure 12B:
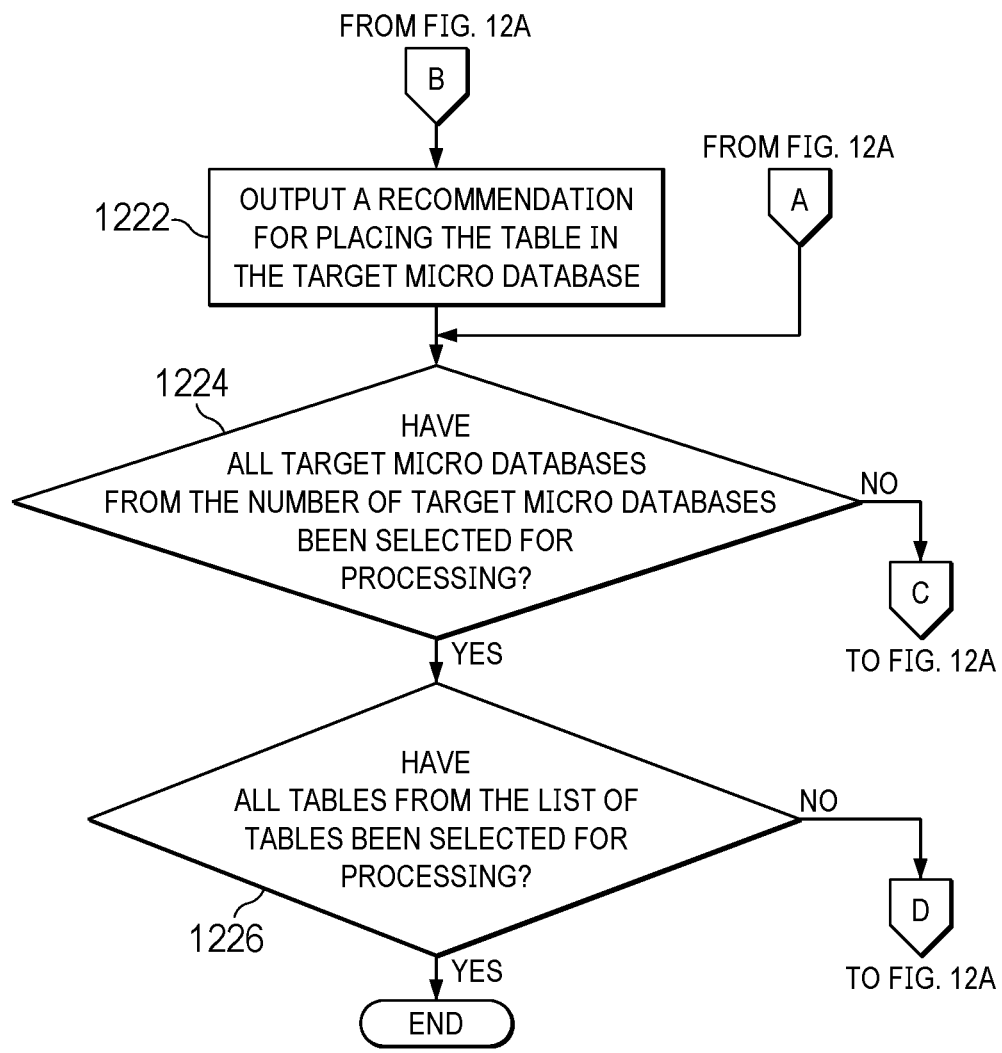

With reference to FIGS. 12A and 12B, a flowchart of a process for recommending updates to groups for microservices is depicted in accordance with an illustrative embodiment. The process in FIGS. 12A and 12B can be implemented in hardware, software, or both. When implemented in software, the process can take the form of program instructions that are run by one of more processor units located in one or more hardware devices in one or more computer systems. For example, the process can be implemented in microservice manager 214 in microservice translation system 202 in FIG. 2. In this example, the process is an implementation of recommending updates to groups for microservices by considering friction issues as described in FIG. 5.

The process begins by identifying a set of cross micro database queries (step 1200). In step 1200, the set of cross micro database queries is all of the cross micro database queries that can occur in the microservices for the application. As depicted, a cross micro database query is a query that involves two or more tables in different micro databases.

This type of query can cause data access issues because a program from the application generating a query to the tables is not designed to send a query to different micro databases. This program is designed to send the query that involves the tables in a single database.

The process identifies a list of tables accessed by the set of cross micro data queries (step 1202). The process selects a table from the list of tables for processing (step 1204). The process identifies a source micro database for the table (step 1206). In step 1206, the source micro database for the table is the micro database that includes the table.

The process identifies a first number of cross micro database queries that access the table (step 1208). The process determines a first execution frequency for the first number of cross micro database queries (step 1210). In step 1210, the first execution frequency is how many times that the first number of cross micro database queries are executed. In other words, the first execution frequency indicates the number of data access issues that occur from the first number of cross micro database queries.

The process identifies a number of target micro databases (step 1212). In step 1212, the number of target micro databases are identified from other tables that are accessed in the number of cross micro database queries. In other words, the process identifies potential micro databases for placing the table to reduce data access issues. The process selects a target micro database from the number of target micro databases for processing to place the table (step 1214).

The process identifies a second number of cross micro database queries that may occur from placing the table in the target micro database (step 1216). In step 1216, table placement can be performed in a number of different ways. For example, the table can be placed in the target micro database by moving the table from the source micro database to the target micro database, or the table can be placed in the target micro database by replicating the table in the source micro database.

The process determines a second execution frequency for the second number of cross micro database queries (step 1218). In step 1218, the second execution frequency is how many times that the second number of cross micro database queries are executed. In this example, the second execution frequency indicates how many data access issues occur from placing the table in the target micro database.

The process determines whether the second execution frequency is less than the first execution frequency by a threshold (step 1220). In step 1220, the process compares the second execution frequency to the first execution frequency to determine whether data access issues associated with the table are reduced by placing the table in the target micro database.

In this illustrative example, the threshold is used to determine whether to output a recommendation for placing the table in the target micro database. For example, the process can output recommendations when placing the table in the target micro database leads to a significant reduction in data access issues. In the illustrative example, the threshold for a significant reduction in data access issues can be determined by a subject matter expert. In other illustrative examples, the subject matter expert can determine whether to make a recommendation.

If the second execution frequency is less than the first execution frequency by the threshold, the process outputs a recommendation for placing the table in the target micro database (step 1222). The process determines whether all target micro databases from the number of target micro databases have been selected for processing (step 1224). In step 1220, if the second execution frequency is not less than the first execution frequency by the threshold, the process also proceeds to step 1224.

If all target micro databases from the number of target micro databases have been selected for processing in step 1224, the process determines whether all tables from the list of tables have been selected for processing (step 1226). If all of the tables in the list of tables have not been selected for processing, the process returns to step 1204. Otherwise, the process terminates. With reference again to step 1224, if not all target micro databases from the number of target micro databases have been selected for processing, the process returns to step 1214 as described above.

The flowchart in FIGS. 12A and 12B is provided as an example of one manner in which a process for recommending updates to groups for microservices can be implemented. This illustration is not meant to limit the manner in which other illustrative examples can be implemented. For example, this process can recommend updates to groups for microservices by considering total execution time of cross micro database queries.

Figure 13:
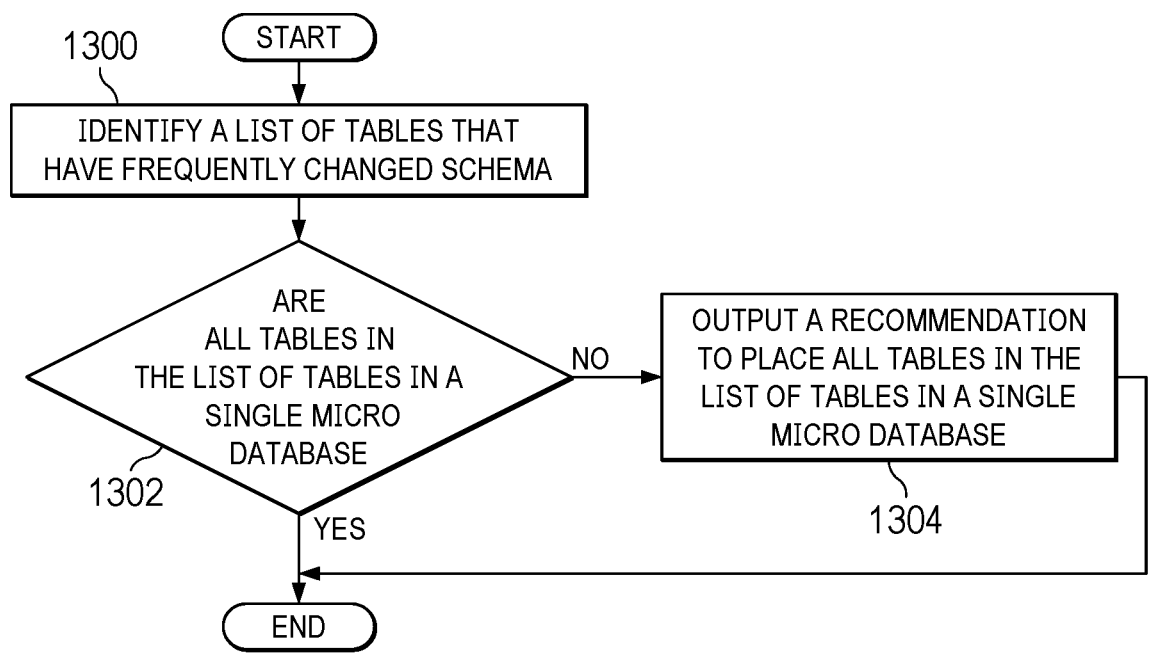
FIG. 13 is a flowchart of a process for recommending updates to groups for microservices in accordance with an illustrative embodiment.

With reference to FIG. 13, a flowchart of a process for recommending updates to groups for microservices is depicted in accordance with an illustrative embodiment. The process in FIG. 13 can be implemented in hardware, software, or both. When implemented in software, the process can take the form of program instructions that are run by one of more processor units located in one or more hardware devices in one or more computer systems. For example, the process can be implemented in microservice manager 214 in microservice translation system 202 in FIG. 2. In this example, the process is an implementation of recommending updates to groups for microservices by considering schema changes frequency as described in FIG. 5.

The process begins by identifying a list of tables that have frequently changed schema (step 1300). The determination of when tables have frequently changed can be made using a threshold for a number of changes. In another example, the list of tables can be determined using input from a subject matter expert.

The process determines whether all tables in the list of tables are in a single micro database (step 1302). If not all tables in the list of tables are in a single micro database, the process outputs a recommendation to place all tables in the list of tables in a single micro database (step 1304). Otherwise, the process terminates.

Figure 14A:
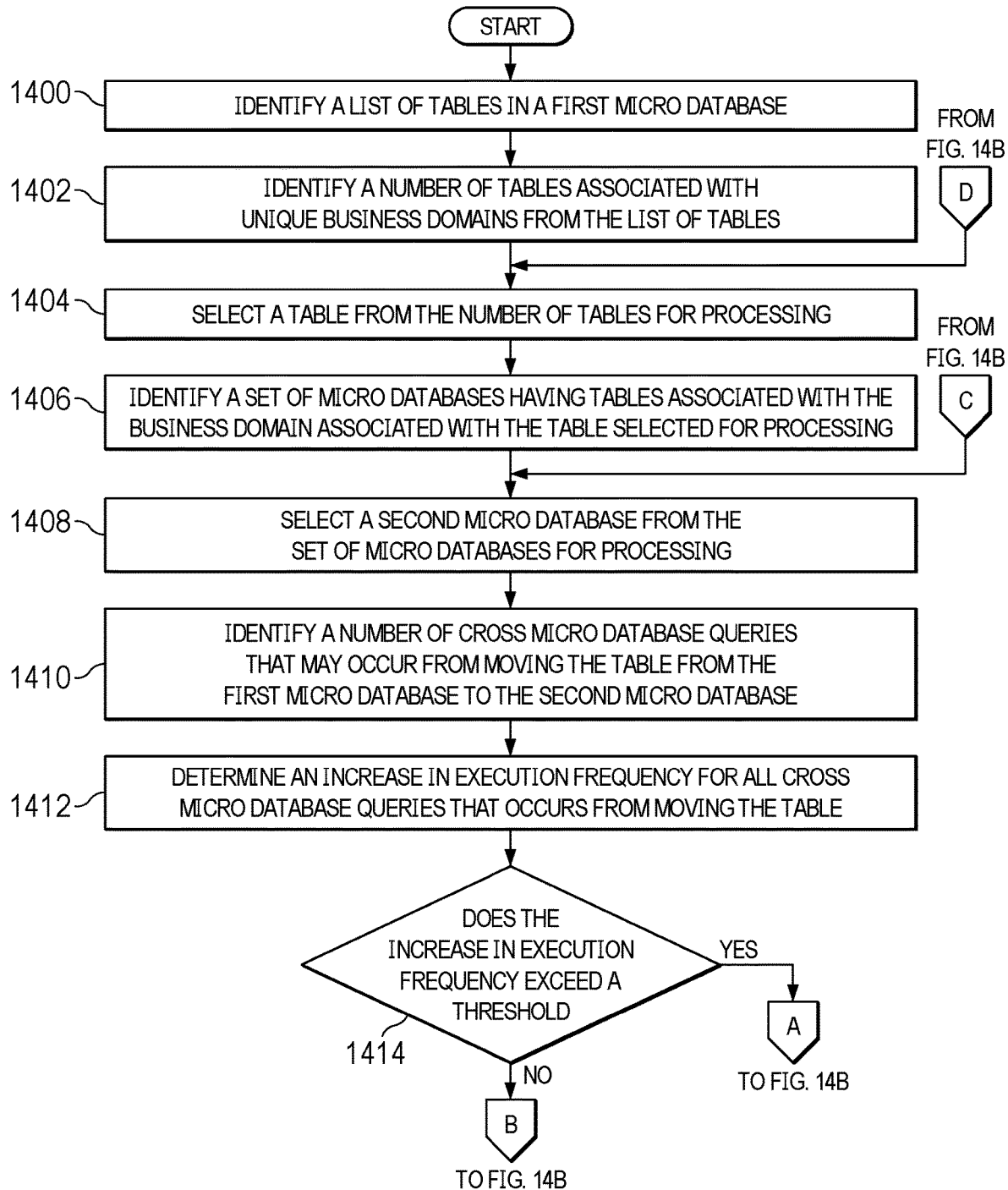
FIGS. 14A and 14B are a flowchart of a process for recommending updates to groups for microservices in accordance with an illustrative embodiment.
Figure 14B:
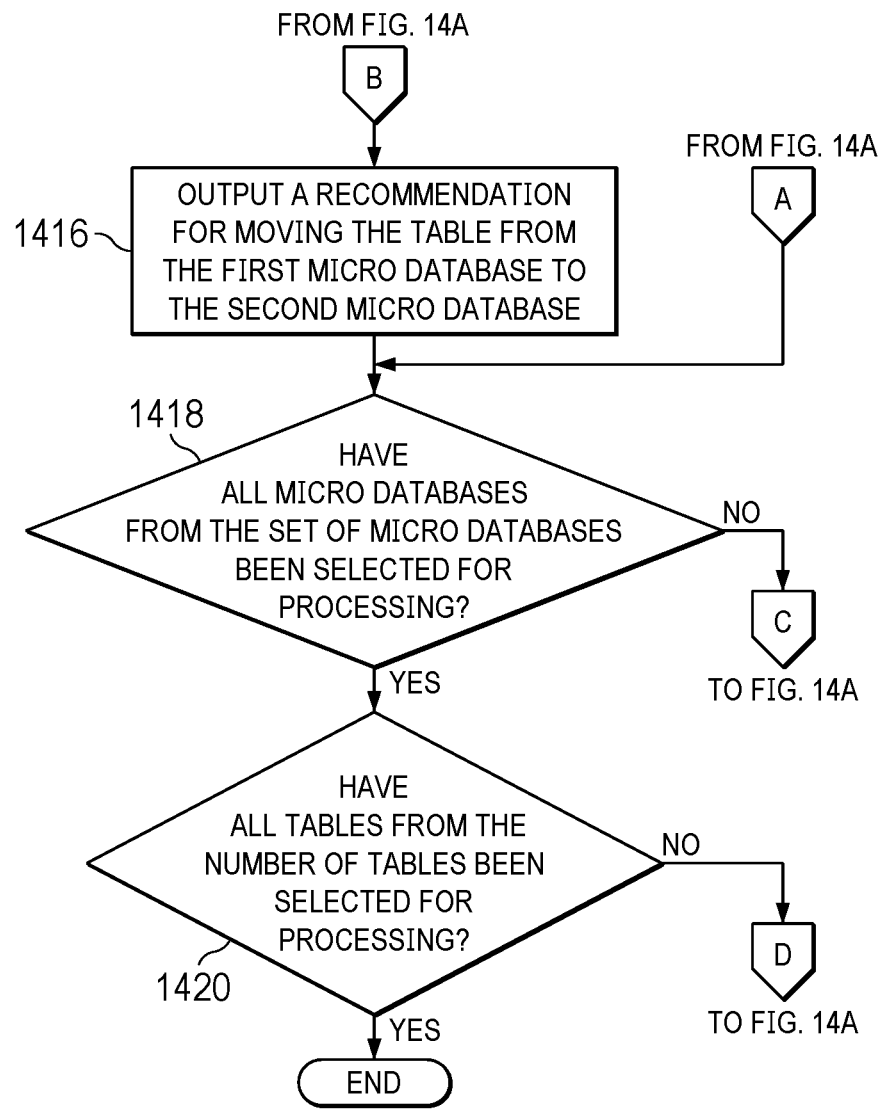

With reference to FIGS. 14A and 14B, a flowchart of a process for recommending updates to groups for microservices is depicted in accordance with an illustrative embodiment. The process in FIGS. 14A and 14B can be implemented in hardware, software, or both. When implemented in software, the process can take the form of program instructions that are run by one of more processor units located in one or more hardware devices in one or more computer systems. For example, the process in this flowchart can be implemented in microservice manager 214 in microservice translation system 202 in FIG. 2. In this example, this flowchart is an example of a process for recommending updates to groups for microservices by considering business domain alignment as described in FIG. 5.

In this example, a business domain alignment is an alignment of the microservices with functions or services provided by a business, an organization, or other entity. For example, one microservice may include programs for opening new accounts in customer service requests while another microservice may process transactions.

The process begins by identifying a list of tables in a first micro database (step 1400). The process identifies a number of tables associated with unique business domains from the list of tables (step 1402). In this example, a business domain is an area of activity or a function provided by a business, organization, or other entity. In step 1402, a business domain is considered unique in this example when the business domain associated with the table does not match other business domains associated with other tables in the first micro database. The business domains can be, for example, loans, offers, sales, marketing, and human resources. The tables can be tables that contain information that can be used for loans, offers, sales, marketing, and human resources.

The process selects a table from the number of tables for processing (step 1404). The process identifies a set of micro databases having tables associated with the business domain associated with the table selected for processing (step 1406). In step 1406, a majority of tables in a micro database in the set of micro databases are associated with the same business domain as the table selected in step 1404. In this step, a majority of tables in micro databases can be defined in the form of percentages. For example, the majority of tables can be 51% of tables in micro database, 60% of tables in micro database, or 75% of tables in micro database.

The process selects a second micro database from the set of micro databases for processing (step 1408). The process identifies a number of cross micro database queries that may occur from moving the table from the first micro database to the second micro database (step 1410).

The process determines an increase in execution frequency for all cross micro database queries that occurs from moving the table (step 1412). In step 1412, the execution frequency for all cross micro database queries is how many times cross micro database queries are executed in all microservices. In this example, an increase in execution frequency for all cross micro database queries indicates how many new data access issues in all microservices can occur from moving the table from the first micro database to the second micro database.

The process determines whether the increase in execution frequency for all cross micro database queries exceeds a threshold (step 1414). If the increase in execution frequency in step 1414 does not exceed a threshold, the process outputs a recommendation for moving the table from the first micro database to the second micro database (step 1416). The process determines whether all micro databases from the set of micro databases have been selected for processing (step 1418). The process also proceeds to step 1418 from step 1414 if the increase in execution frequency does exceed a threshold.

In step 1418, if all micro databases from the set of micro databases have been selected for processing, the process determines whether all tables from the number of tables have been selected for processing (step 1420). If all of the tables have not been selected for processing, the process returns to step 1404 as described above. With reference again to step 1418, if all micro databases from the set of micro databases have not been selected for processing, the process returns to step 1408 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
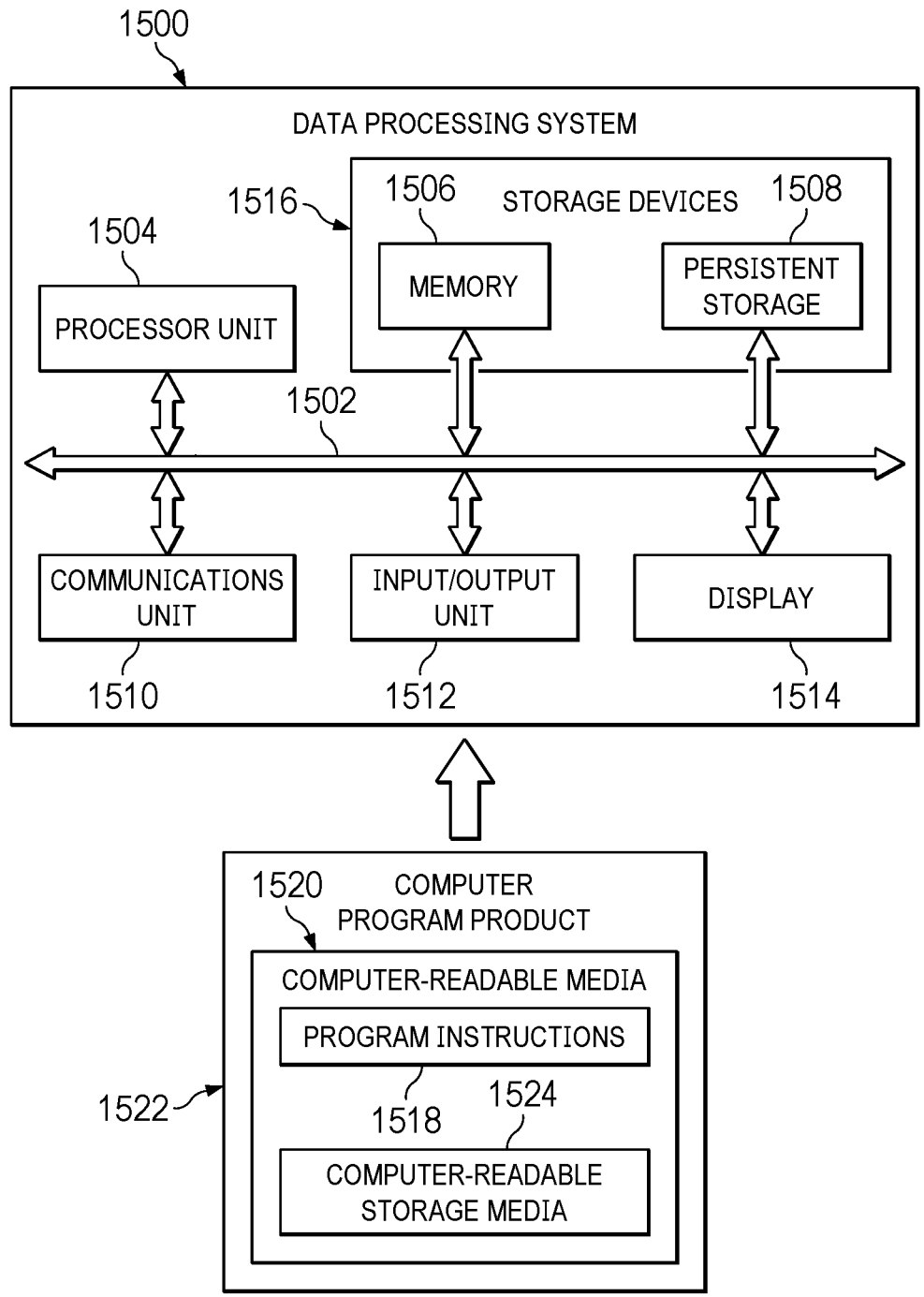
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement computers and computing devices in computing environment 100 in FIG. 1. Data processing system 1500 can also be used to implement computer system 212 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can may be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may 1516 may also be referred to as computer-readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer-readable program instructions that can be read and executed by a processor in processor unit 1504. The program instructions in the different embodiments can be embodied on different physical or computer-readable storage media, such as memory 1506 or persistent storage 1508.

Program instructions 1518 is located in a functional form on computer-readable media 1520 that is selectively removable and can be loaded onto or transferred to data processing system 1500 for execution by processor unit 1504. Program instructions 1518 and computer-readable media 1520 form computer program product 1522 in these illustrative examples. In the illustrative example, computer-readable media 1520 is computer-readable storage media 1524.

Computer-readable storage media 1524 is a physical or tangible storage device used to store program instructions 1518 rather than a medium that propagates or transmits program instructions 1518. Computer-readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1518 can be transferred to data processing system 1500 using a computer-readable signal media. The computer-readable signal media are signals and can be, for example, a propagated data signal containing program instructions 1518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1520" can be singular or plural. For example, program instructions 1518 can be located in computer-readable media 1520 in the form of a single storage device or system. In another example, program instructions 1518 can be located in computer-readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer-readable media 1520 in a server computer while another portion of program instructions 1518 can be located in computer-readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, illustrative embodiments of the present invention provide a computer implemented method, computer system, and computer program product for creating microservices for an application. A number of processor units clusters programs and data structures for the application using runtime metadata to form groups of the programs and data structures. The runtime metadata is obtained from running the application. The number of processor units creates a design for the microservices using the groupings of the programs and the data structures. This design can be used to create the microservices for the application.

In the illustrative examples, the creation of the design of the microservices is performed using runtime metadata obtained from running the application. In these illustrative examples, the runtime metadata can be obtained by recording the interactions and communications for the application while the application runs. The illustrative examples also can refine groups of programs and data structures in the design. This refinement can be performed to take into account various objectives.

Additionally, the design can also include an order in which the microservices should be implemented or rolled out. This priority can be based on the runtime metadata. The priority can be based on an amount of time needed to implement the microservices.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for creating microservices for an application, the computer implemented method comprising:
    clustering, by a number of processor units, programs and data structures for the application using runtime metadata to form groups of the programs and the data structures for the microservices, wherein the runtime metadata is obtained from running the application and wherein the runtime metadata comprises information describing how the programs in the application interacts with data in the data structures in response to running the application;
    creating, by the number of processor units, a design for the microservices for the application using the groups of the programs and the data structures;
    recommending, by the number of processor units, updates to the groups to meet a set of objectives; and
    performing, by the number of process or units, a number of the updates to the groups of the programs and the data structures based a selection of the number of the updates,
    wherein each group in the groups is for a microservice in the microservices and wherein recommending, by the number of processor units, the updates to the groups to meet the set of objectives comprises:
    identifying a first number of cross database queries that access a data structure in a source database for the data structure;
    determining a first execution frequency for the first number of cross database queries;
    identifies a second number of cross database queries that occur from placing the data structure in a target database;
    determining a second execution frequency for the second number of cross database queries; and
    recommending moving the data structure from the source database to the target database in response to the second execution frequency being less than the first execution frequency by a threshold.

2. The computer implemented method of claim 1, wherein clustering, by the number of processor units, the programs and the data structures for the application using the runtime metadata to form the groups of the programs and the data structures comprises:
    creating, by the number of processor units, a call graph, wherein nodes in the call graph represent the programs and the data structures in the application and wherein edges between the nodes identify relationships between the programs and between the programs and the data structures; and
    clustering, by the number of processor units, the programs and the data structures for the application using the call graph and the runtime metadata to form the groups of the programs and the data structures, wherein the runtime metadata is obtained from running the application.

3. The computer implemented method of claim 2 further comprising:
    setting, by the number of processor units, weights for the edges in the call graph using the runtime metadata.

4. The computer implemented method of claim 3, wherein the runtime metadata used to set the weights are selected from a group consisting at least one of a frequency a table is accessed by a particular program, an execution frequency of queries on a database, a frequency at which different queries are made by a program, average time to execute a query, change in data schemas, times at which the queries are executed, or an average output size for the query.

5. The computer implemented method of claim 1, wherein each group in the groups is for a microservice in the microservices and wherein recommending, by the number of processor units, the updates to the groups to meet the set of objectives comprises:
    recommending, by the number of processor units, the updates to the groups that reduce data access issues in accessing data in the microservices, wherein the updates comprises placement of the programs and data structures in the groups taking into account the runtime metadata using criteria that reduces the data access issues.

6. The computer implemented method of claim 1, further comprising:
    determining, by the number of processor units, an order in which to create the microservices for the application based a complexity of each of the microservices.

7. A computer system comprising:
    a number of processor units, wherein the number of processor units executes program instructions to:
    cluster programs and data structures for an application using runtime metadata to form groups of the programs and the data structures for microservices, wherein the runtime metadata is obtained from running the application and wherein the runtime metadata comprises information describing how the programs in the application interacts with data in the data structures in response to running the application;
    create a design for microservices for the application using the groups of the programs and the data structures;
    recommend updates to the groups to meet a set of objectives; and
    perform a number of the updates to the groups of the programs and the data structures on a selection of the number of the updates,
    wherein each group in the groups is for a microservice in the microservices and wherein recommend updates to the groups to meet the set of objectives comprises:
    identify a first number of cross database queries that access a data structure in a source database for the data structure;
    determine a first execution frequency for the first number of cross database queries;
    identify a second number of cross database queries that occur from placing the data structure in a target database;
    determine a second execution frequency for the second number of cross database queries; and
    recommend moving the data structure from the source database to the target database in response to the second execution frequency being less than the first execution frequency by a threshold.

8. The computer system of claim 7, wherein in clustering the programs and the data structures for the application using the runtime metadata to form the groups of the programs and the data structures, the number of processor units executes the program instructions to:
  create a call graph, wherein nodes in the call graph represent the programs and the data structures in the application and wherein edges between the nodes identify relationships between the programs and between the programs and the data structures; and
  cluster the programs and the data structures for the application using the call graph and the runtime metadata to form the groups of the programs and the data structures, wherein the runtime metadata is obtained from running the application.

9. The computer system of claim 8, wherein the number of processor units executes the program instructions to:
  set weights for the edges in the call graph using the runtime metadata.

10. The computer system of claim 9, wherein the runtime metadata used to set the weights are selected from a group consisting at least one of a frequency a table is accessed by a particular program, an execution frequency of queries on a database, a frequency at which different queries are made by a program, average time to execute a query, change in data schemas, times at which the queries are executed, or an average output size for the query.

11. The computer system of claim 7, wherein in recommending the updates to the groups to meet the set of objectives, the number of processor units executes the program instructions to:
  recommend the updates to the groups that reduce data access issues in accessing data in the microservices.

12. The computer system of claim 7, wherein the number of processor units executes the program instructions to:
  determine an order in which to create the microservices for the application based a complexity of each of the microservices.

13. A computer program product for creating microservices for an application, the computer program product comprising a computer-readable storage medium having program instructions embodied therewith, the program instructions executable by a computer system to cause the computer system to perform a method of:
  clustering programs and data structures for the application using runtime metadata to form groups of the programs and the data structures for the microservices, wherein the runtime metadata is obtained from running the application and wherein the runtime metadata comprises information describing how the programs in the application interacts with data in the data structures in response to running the application;
  creating a design for the microservices for the application using the groups of the programs and the data structures;
  recommending updates to the groups to meet a set of objectives; and
  performing a number of the updates to the groups of the programs and the data structures based a selection of the number of the updates,
  wherein each group in the groups is for a microservice in the microservices and wherein recommending, by the number of processor units, the updates to the groups to meet the set of objectives comprises:
    identifying a first number of cross database queries that access a data structure in a source database for the data structure;
    determining a first execution frequency for the first number of cross database queries;
    identifies a second number of cross database queries that occur from placing the data structure in a target database;
    determining a second execution frequency for the second number of cross database queries; and
    recommending moving the data structure from the source database to the target database in response to the second execution frequency being less than the first execution frequency by a threshold.

14. The computer program product of claim 13, wherein clustering the programs and the data structures for the application using the runtime metadata to form the groups of the programs and the data structures comprises:
  creating a call graph, wherein nodes in the call graph represent the programs and the data structures in the application and wherein edges between the nodes identify relationships between the programs and between the programs and the data structures; and
  clustering the programs and the data structures for the application using the call graph and the runtime metadata to form the groups of the programs and the data structures, wherein the runtime metadata is obtained from running the application.

15. The computer program product of claim 13, wherein refining the groups of the programs and the data structures based on a policy that defines rules for grouping the programs and the data structures comprises:
  refining the groups of the programs and the data structures based that reduces data access issues in the microservices.

16. The computer implemented method of claim 1, wherein the data structure is a table, the source database is source micro database, and the target database is a target micro database.

17. The computer implemented method of claim 1, wherein each group in the groups is for a microservice in the microservices and wherein recommending, by the number of processor units, the updates to the groups to meet the set of objectives comprises:
  identifying a list of data structure tables that have frequently changed schema in which the frequently changed schema are schema that have changes greater than a threshold;
  determining whether all tables in the list of tables are in a single micro database; and
  recommending placing all tables in the list of tables in a single micro database in response to all of the tables in the list of table not being in a single micro database.

18. The computer program product of claim 14 further comprising:
  setting weights for the edges in the call graph using the runtime metadata.

19. The computer program product of claim 18, wherein the runtime metadata used to set the weights are selected from a group consisting at least one of a frequency a table is accessed by a particular program, an execution frequency of queries on a database, a frequency at which different queries are made by a program, average time to execute a query, change in data schemas, times at which the queries are executed, or an average output size for the query.

20. The computer program product of claim 13, wherein the data structure is a table, the source database is source micro database, and the target database is a target micro database.

* * * * *